United States Patent
Ardiri et al.

(10) Patent No.: US 9,756,501 B2
(45) Date of Patent: Sep. 5, 2017

(54) SYSTEM AND METHOD FOR WIRELESS DEVICE CONFIGURATION

(75) Inventors: Aaron Ardiri, Munich (DE); Stephan Hellerbrand, Munich (DE)

(73) Assignee: BlackBerry Limited, Waterloo (CA)

( * ) Notice: Subject to any disclaimer, the term of this patent is extended or adjusted under 35 U.S.C. 154(b) by 1305 days.

(21) Appl. No.: 13/331,851

(22) Filed: Dec. 20, 2011

(65) Prior Publication Data

US 2013/0103815 A1 Apr. 25, 2013
US 2013/0318220 A2 Nov. 28, 2013

Related U.S. Application Data

(60) Provisional application No. 61/550,684, filed on Oct. 24, 2011.

(51) Int. Cl.
*G06F 15/173* (2006.01)
*H04W 8/18* (2009.01)

(52) U.S. Cl.
CPC .................................. *H04W 8/186* (2013.01)

(58) Field of Classification Search
CPC .................................................... G06F 15/173
USPC ........................................................ 709/233
See application file for complete search history.

(56) References Cited

U.S. PATENT DOCUMENTS

| | | | |
|---|---|---|---|
| 7,062,259 B1 * | 6/2006 | Dispensa et al. | 455/418 |
| 8,224,988 B2 * | 7/2012 | Kubota | H04L 29/06 709/220 |
| 8,504,680 B1 * | 8/2013 | Hernacki et al. | 709/224 |
| 8,875,218 B2 * | 10/2014 | Lim | 726/1 |
| 2006/0277590 A1 | 12/2006 | Limont | |
| 2007/0011283 A1 * | 1/2007 | Brown et al. | 709/220 |
| 2008/0070495 A1 | 3/2008 | Stricklen | |
| 2008/0163334 A1 * | 7/2008 | Perich et al. | 726/1 |
| 2010/0112983 A1 * | 5/2010 | Walker et al. | 455/411 |

OTHER PUBLICATIONS

Canadian Intellectual Property Office, Office Action, Application No. 2790259, Sep. 23, 2014.
Canadian Intellectual Property Office, Office Action on Application No. 2,790,259 , Issued on Oct. 23, 2015.
European Patent Office, Extended European Search Report on Application No. 12183399.0, Issued on Aug. 17, 2015.
Canadian Intellectual Property Office, Office Action for Application No. 2790259, issued Sep. 19, 2016.
European Patent Office, Office Action for Application No. 12183399.0, issued on Nov. 4, 2016.

* cited by examiner

*Primary Examiner* — Vivek Srivastava
*Assistant Examiner* — Sibte Bukhari
(74) *Attorney, Agent, or Firm* — Moffat & Co.

(57) ABSTRACT

A method for managing policies for groups of wireless devices, associated with a corresponding one of multiple different wireless device platforms comprising collecting for all platforms a set of configurations and policies supported by the platforms, and generating a master set of device agnostic rule definitions from the collected configurations and policies, the rules being defined without regard to constraints on the configuration settings governed by the multiple different wireless device platforms.

18 Claims, 6 Drawing Sheets

SYSTEM AND METHOD FOR WIRELESS DEVICE CONFIGURATION

RELATED APPLICATIONS

The present disclosure is a non-provisional of U.S. Provisional Application No. 61/550,684, filed Oct. 24, 2011, the entire contents of which are incorporated herein by reference.

FIELD OF THE DISCLOSURE

The present disclosure relates to wireless devices and in particular to systems and methods for managing policy configurations on wireless devices of differing types and platforms deployed within an organization.

BACKGROUND

Company employees increasingly use their choice of wireless devices to carry out mobile business processes. IT departments are therefore faced with the challenge of centrally managing several mobile platforms simultaneously.

When a wireless device is issued by a corporation to an employee the corporation may choose to limit certain functionality on the device in order, for example, to reduce the risk of exposure of corporate data on the wireless device. This may be done, for example, through information technology (IT) policies. An IT policy is a set of rules that dictates the allowable or unallowable functionality of a device that operates on a network. Accordingly, an IT administrator can use IT policy to ensure that all devices comply with certain rules, and are limited to certain functionality. For instance, the IT administrator can use IT policy to allow the use of certain features on a device, specify certain security settings for the device, specify applications that are allowed to execute on the device, and the like.

Device manufacturers and vendors are interested in delivering wireless device management solutions that are specific to their own devices and that support their own product range and platforms. An organization wishing to deploy wireless devices from more than one manufacturer is faced with implementing and managing multiple management systems. These systems allow an administrator to manage devices over-the-air, including activating devices, distributing software and applications, locking or wiping devices, enforcing and resetting device passwords, setting IT policies, and managing optional mobile applications for end users.

Application of configuration and policies by a wireless device management system to a group of wireless devices is a complicated endeavor. Such application action is made more complicated when the wireless devices are of differing types and platforms, where the configuration and policies are implemented in differing ways dependent upon the type of wireless device or platform and operating system.

Furthermore, the user and/or the enterprise network may have different requirements for each of the user's accounts on the different devices and the enterprise network might impose different policies, permissions and guidelines for each device type even though the accounts on each device belong to the same user.

Current implementations of policy management across platforms take several approaches. One approach is to take a set of policies and configurations for a first platform and convert those policies and configurations into a second set of policies suitable for a second platform. This approach can be cumbersome and error prone, since one of the platforms may have more or fewer features than the other or there may not be a direct relationship between features across the different platforms.

Another approach is to manage configurations for wireless devices in "silos". Specifically policies have sections specific to each platform, for example iOS configurations, Android configurations, Windows mobile configurations. In other words, the management system comprises multiple sub applications or "silos" that work independently of each other. In this approach an administrator may have to duplicate configurations across platforms i.e. the same policy configurations may have to be created multiple times which makes future maintenance error prone, particularly if new device types or platforms are added. Furthermore the administrator needs knowledge of the peculiarities of the various platforms and devices and very little will be presented as "common" across all platforms.

Thus a system and method for reducing complexity in implementing different configurations and policies on different platforms and types of wireless devices is desirable. The system may further be able to present configurations in a device agnostic manner allowing an administrator to focus on mobile device management rather than device and platform idiosyncrasies.

BRIEF DESCRIPTION OF THE DRAWINGS

The present disclosure will be better understood with reference to the drawings, in which.

DETAILED DESCRIPTION OF THE DRAWINGS

In the present description, like numerals refer to like structures or functions in the drawings. Terms such as wireless device used in a wireless communication network may also be referred to as a mobile station ("MS"), mobile device, a terminal, a cellular phone, a cellular handset, a personal digital assistant ("PDA"), a smartphone, a handheld computer, a desktop computer, a laptop computer, a tablet computer, a set-top box, a television, a wireless appliance, or some other equivalent terminology. A wireless device may contain one or more RF transmitters and receivers, and one or more antennas to communicate with a base station. Further, a wireless device may be fixed or mobile and may have the ability to move through a wireless communication network. For LTE and LTE-A equipment, the wireless device is also referred to as user equipment ("UE").

The present disclosure describes a method for managing policies for groups of wireless devices, associated with a corresponding one of multiple different wireless device platforms comprising: collecting for all platforms a set of configurations and policies supported by the platforms; and generating a master set of device agnostic rule definitions from the collected configurations and policies, the rules being defined without regard to constraints on the configuration settings governed by the multiple different wireless device platforms.

A further aspect of the method including creating mappings for each platform, the mappings allowing for selection of appropriate platform subsets from the master set.

A further aspect of the method including, the mapping associating device hardware with rule definitions.

A further aspect of the method including the mapping associating wireless operating system type with rule definitions.

A further aspect of the method including, the mapping associating device vendor with rule definitions.

A further aspect of the method including the mapping associating operating system family with rule definitions.

The present disclosure further describes a method for managing policies on groups of wireless devices, members of the group having configurable options that are set by configuration settings governed by a platform policy corresponding to one of multiple different wireless device platforms associated with respective ones of the group of wireless devices, the method comprising: generating a global policy for the group, the policy having at least one policy item, defining rules for limiting certain functionality of the group, the rules being defined without regard to constraints on the configuration settings governed by the multiple different wireless device platforms; determining said platform policies from the global policy by selecting subsets of policy items applicable to particular ones of said wireless device platforms; and mapping policy items in the platform policy to the corresponding configuration settings for the particular ones of said wireless device platforms; and applying the mapped policy items to the associated wireless devices.

In accordance with a further aspect the platform policies are applied during configuration of the specific device.

In a further aspect the policy items and rules are represented as key-value pairs.

In another aspect the generating of the global policy is via a user interface (UI).

In a still further aspect the generating of the global policy includes receiving configuration settings for the respective ones of the group of wireless devices from their corresponding platforms; and collating the received configurations into a single union set to represent similar configurations under a new policy item; presenting the collated configurations as a combined set of device agnostic policies for manipulation by an administrator.

In a still further aspect the received configurations are combined into a set of generic keys to represent a set of policies.

In another aspect the collating of the received configurations includes processing all collected keys to produce newly defined keys such that no direct reference to the platforms from which the configurations were obtained can be identified in the newly defined keys.

A further aspect of the present disclosure describes a system for managing policies for groups of wireless devices, each member of the group having configurable options that are set by configuration settings defined in a platform policy, the configuration settings in the platform policy are determined by a corresponding one of multiple different wireless device platforms associated with respective ones of the group of wireless devices, the system comprising: a core module configured for: generating a global policy for the group, the policy having at least one policy item, defining rules for limiting certain functionality of the group, the rules being defined without regard to constraints on the configuration settings governed by the multiple different wireless device platforms; and determining said platform policies from the global policy by selecting subsets of policy items applicable to particular ones of said wireless device platforms; and a communications module configured for: mapping rules in said subsets of policy items to the corresponding configuration settings for the particular ones of said wireless device platforms.

In a further aspect the communications module includes applying the platform polices to the associated wireless devices during configuration of the device.

A further aspect of the present system including a console module for presenting the global policy for manipulation by an administrator.

Figure 1:
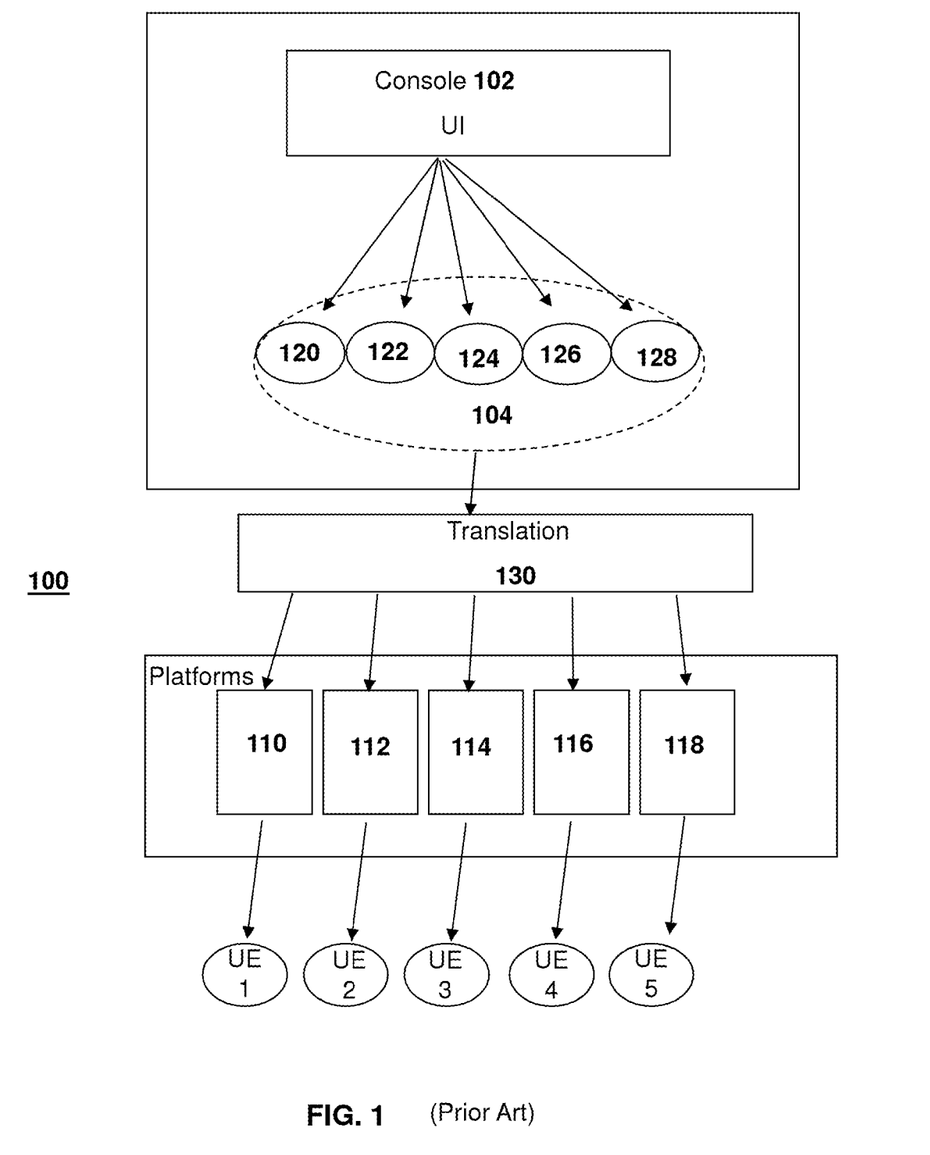
FIG. 1 is a block diagram showing policy management in a typical multiplatform device management system.

Referring now to FIG. 1 there is shown a typical policy management system 100 for multiplatform device management. The system 100 typically includes a console module 102 presenting a user interface (UI) for an administrator (not shown) for managing by creating, displaying or manipulating a configuration policy 104 to be applied to devices UE1-UE5. The system 100 as illustrated includes five different management platforms 110-118 to which the respective devices UE1-UE5 are associated. The one or more devices UE1-UE5 may connect through a cellular network (not shown) to provide voice and/or data services. The devices may be different devices such as BlackBerry™ devices, tablets, Apple iPhone™, Android™-based devices, etc. employing correspondingly different operating systems such as Android™, Windows 7™ etc. and each managed by a corresponding platform 110-118. Policy information 104 may be applied by a policy server (not shown). These policies comprise one or more policy elements that define one or more aspects of the wireless device's configuration. The different device models, from the same or different manufacturers, may have differing implementations 120-128 of the policy applied to them. Thus, the policy elements used, and their settings may vary from device to device. Policies are defined in various ways, depending on the device type they apply to, the policy server used to install them and/or verify device compliance with them.

Typically policies are disseminated from policy servers, which act as a source of policies for transport to the devices they apply to, using various policy management protocols. Policy management protocols comprise protocols for interaction between policy servers and devices receiving policies. These protocols can provide means not only to transfer the policy to the receiving device or devices, but also to manage policies on those devices, such as by verifying that the policy has been received by the device, verifying device compliance with the policy, removing the policy, updating the policy, or other policy-related activities. The manner in which these functions are accomplished varies from one policy management protocol to another.

As illustrated, the configuration policies 104, although treated as a single policy, include five different implementation policies 120-128 corresponding to respective ones of the platforms 110-118. A translation module 130 receives the policy 104 and identifies the policies 120-128 applicable to the device platforms and supplies the policy elements to the appropriate platform for transmission to the mobile devices. This example is illustrative of an approach where policies for the group are maintained as independent policies for each of the platforms and where the administrator creating a global policy 104 has to be aware of the different devices and platforms.

Figure 2:
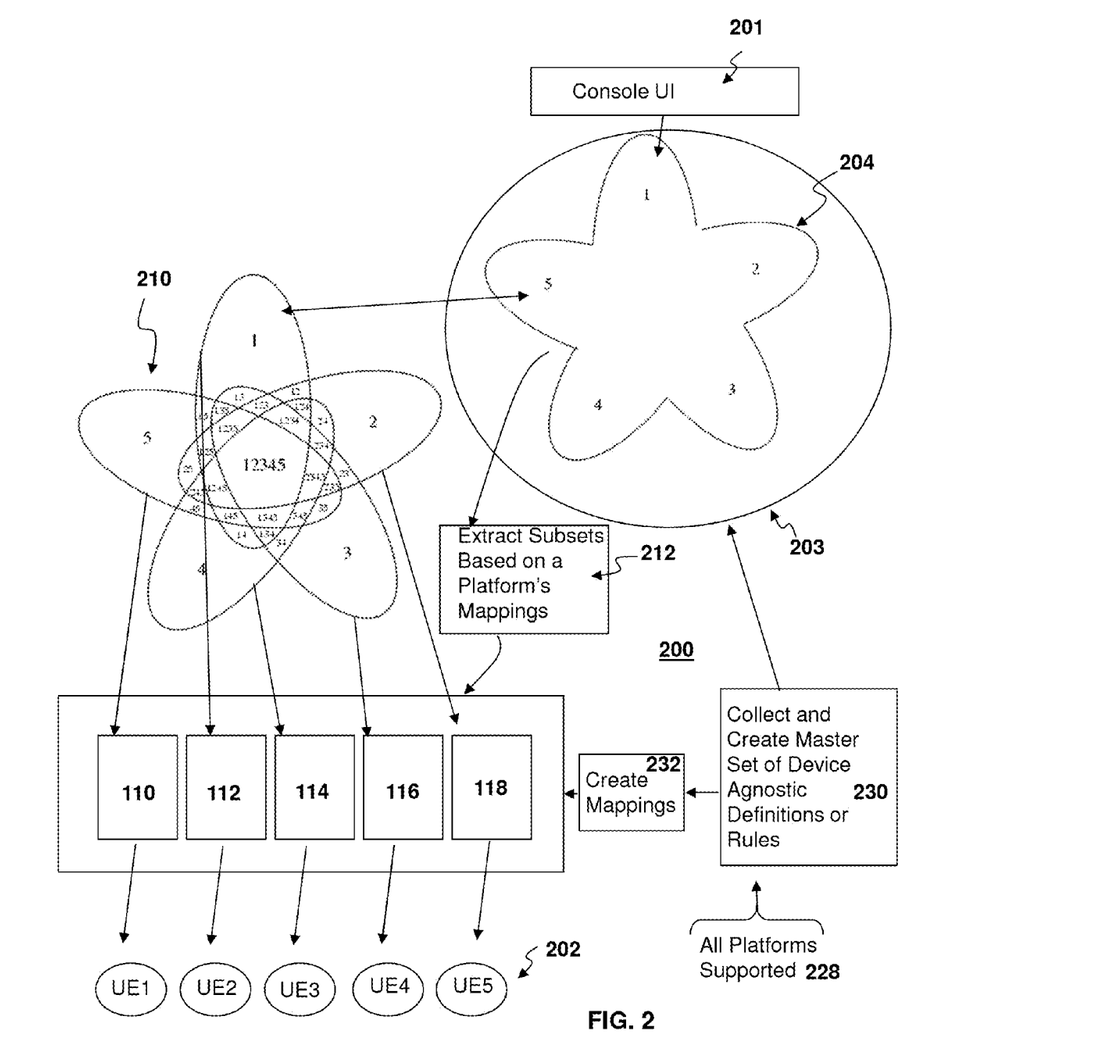
FIG. 2 is a block diagram showing policy management in a multiplatform device management system according to an embodiment of the present matter.

Referring now to FIG. 2 there is shown conceptually a method 200 for managing policies for a group of wireless devices 202 according to an embodiment of the present matter. At system setup, a number of configuration and policy settings for all platforms to be supported 228 by the system are collected and collated into a single union set which represents a combined set of policies and configurations 230 across all the platforms of interest in an enterprise. The resulting set is then abstracted into a device-agnostic state such that the collected configurations and settings of a similar nature are grouped together. This process is performed for all possible combinations of collected configurations and settings across all the platforms to produce a master set of device agnostic definitions or rules, notionally illustrated by circle 203, with no direct orientation to the devices to which the definitions will be applied nor with any reference identifying the devices from which the configurations were obtained. A set of mappings 232 may be created for each platform 110-118 which allows both for selection of appropriate platform subsets for a specific platform from a global policy created from the master set and for translating the subsets into device specific configurations for application to the appropriate devices UE1-UE5. The mappings modules thus contain platform and device associations to the generic definitions. Set-up may be performed by an Administrator via a console module 201.

The administrator via the console module 201 creates a global policy 204 from this master set of device agnostic policies within circle 203. This global policy 204 is notionally illustrated as a subset set of the master set 203 containing generic policy items to be applied to a group of wireless devices UE1-UE5. The policy items in the set are device agnostic and can be set by an administrator without regard to the specific devices that the policies are being applied to. For example, the Administrator could create a policy such as "no social networking, no games, password must comply with these rules, the following WiFi/VPN network settings should be defined, the following email account configuration should be defined". In effect, however, the set 204 is a union of the various platform specific policies (five in the subject example), as is notionally represented by Venn diagram 210. From the Venn diagram 210 each platform policy may be seen as a subset of the global policy set 204. In other words, the policy 204 is comprised of a union of five platform policy sets. However, when the policy 204 is created the Administrator need not be aware of the specific subsets of the policies that apply to the specific different wireless device platforms 110-118 or wireless devices UE1-UE2. For example as shown by the Venn diagram 210, regions labeled '1'-'5' are configurations or features not shared by all the platforms, but rather are specific to their respective platforms. On the other hand, the region labeled '12345' is common to all platforms. Table I below represents different regions of the Venn diagram 210 and better illustrates various combinations of policy items in the global policy 204. For example the first row of Table I shows where policy items are unique to each of the platforms 110-118 ('1'-'5'), the subsequent rows two, three and four show policy items shared by the different platforms. For example the numeral '12' indicates platforms '1' and '2' share some policy items, numeral '345' indicates platforms '3', '4' and '5' share those policy items and so forth.

TABLE I

| 1 | 2 | 3 | 4 | 5 |
|---|---|---|---|---|
| 12 13 15 | 25 45 14 | 34 | 35 23 | 24 |
| 123 135 125 | 245 145 134 | 345 | 235 234 | 124 |
| 1234 | 1235 | 1245 | 1345 | 2345 |

From the global policy 204, subsets of platform policies are extracted based on the platform 212 using its corresponding mapping 110-118. As mentioned above, the policy is device and platform agnostic, however each platform maintains a mapping 110-118 of its configurations to the generic policy items i.e. each platform is aware of all the generic policy definitions that apply to it. The relevant subset is extracted using this mapping. The platform then takes the subset of policies and maps or translates the generic policy definitions to the appropriate wireless device configurations. As provided above, the mapping contains the appropriate translations to the device specific/supported configurations. It may be seen that the administrator does not have to be aware, for example, of the various combinations of features either supported or not supported by the various platforms or devices. Thus in traditional approaches the administrator would have to be aware of the various combinations shown in Table I. i.e the Administrator would have to be aware of what is supported or not supported by various platforms/devices.

In one embodiment global policy information 204 may be stored in the form of key-value pairs or "tuples." Tuples are unordered sequences of (key, value) pairs: ((k1, v1) (k2, v2) . . . ). Keys are text strings, and values are un-interpreted byte sequences. A value v may also be comprised of additional tuples. For the purposes of the description, the key definitions may be represented in a dot-notation. In one embodiment the policy containing key-value pairs is stored in a suitable database. A key definition defines attributes of an entity, wherein an entity is an element that that uniquely defines a specific class of object within the realm of mobile device management. The entity properties are stored using key-value pairs.

Consider the following as an example of keys:
{scope.policy.}restriction.disable.store.music
{scope.policy.}restriction.disable.store.application
{scope.policy.}restriction.disable.browser
{scope.policy.}restriction.disable.social.video
{scope.policy.}restriction.disable.social.networking These are abstracted configuration definitions specified by the administrator without any reference to specifics of a device or platform. For example considering the definition
{scope.policy.}restriction.disable.store.application
on one operating system would be a policy definition for the disablement of the operating system (OS) application store, e.g. for iOS™ this would be the App store™ however, on another operating system such as Google Android™, it would be for the Android Market™. On other platforms; there may not be an application store—so the configuration would not have any meaning at all.

In another example the definitions
{scope.policy.}restriction.disable.social.video
{scope.policy.}restriction.disable.social.networking
would refer to applications such as YouTube™/Vimeo™ and Facebook™/Orkut™ the specific application being referred to is platform specific; but from an administrator's or enterprise policy point of view what is meant is "do not allow any form of social video application to be used and do not allow any form of social networking application to be used". Key-value mappings describe all mappings between the key-value pairs and the devices. It is to be noted that while key value pairs are exemplified other schemas may also be possible.

While the above example keys are specific to Boolean definitions; the definitions can be extended to be specific to platforms via an override technique to identify various JSON schema's for the possible values. For example the following definition specifies an auto lock period for devices:
{scope.policy.}password.lock.period
and has a JSON schema (generic) as:

```
{
  "type": "integer",
  "default": 0,
  "minimum": 0,
  "optional": true
}
``` however; in an iOS device it is a shorter list of configurations;
namely:

```
{
  "type": "integer",
  "default": 0,
  "enum": [ "0", "60", "120", "180", "240", "300" ],
  "optional": true
}
``` as these are the only values that are accepted for the "auto-lock" configuration on iOS™. A translation engine is implemented within the communication module and is responsible for mapping the key value definition into a value that is appropriate for the device itself. Consider this example; the policy item defines a value of 53. The communication module has to map the value 53 into an acceptable value within the operating system protocol. Eq. iOS MDM; using a formula like the following:

$$timeout=max(300, ceiling(timeout, mod\ 60))$$

the value defined is appropriately mapped to an acceptable value by the communication module. The use of key-value mappings is based on the idea that every key definition is filtered by the definition of a profile which can ensure only the right information is communicated based on the device in use. The mappings defined depend solely on the operating system providers and device manufacturers.

The system thus also provides mappings to platform specific restrictions from the device agnostic view of the configuration. The present system thus allows for definition of a device agnostic wireless device management policies, which are then mapped by the system to specific platforms based on the specific capabilities or features of the platform and or devices.

Figure 3:
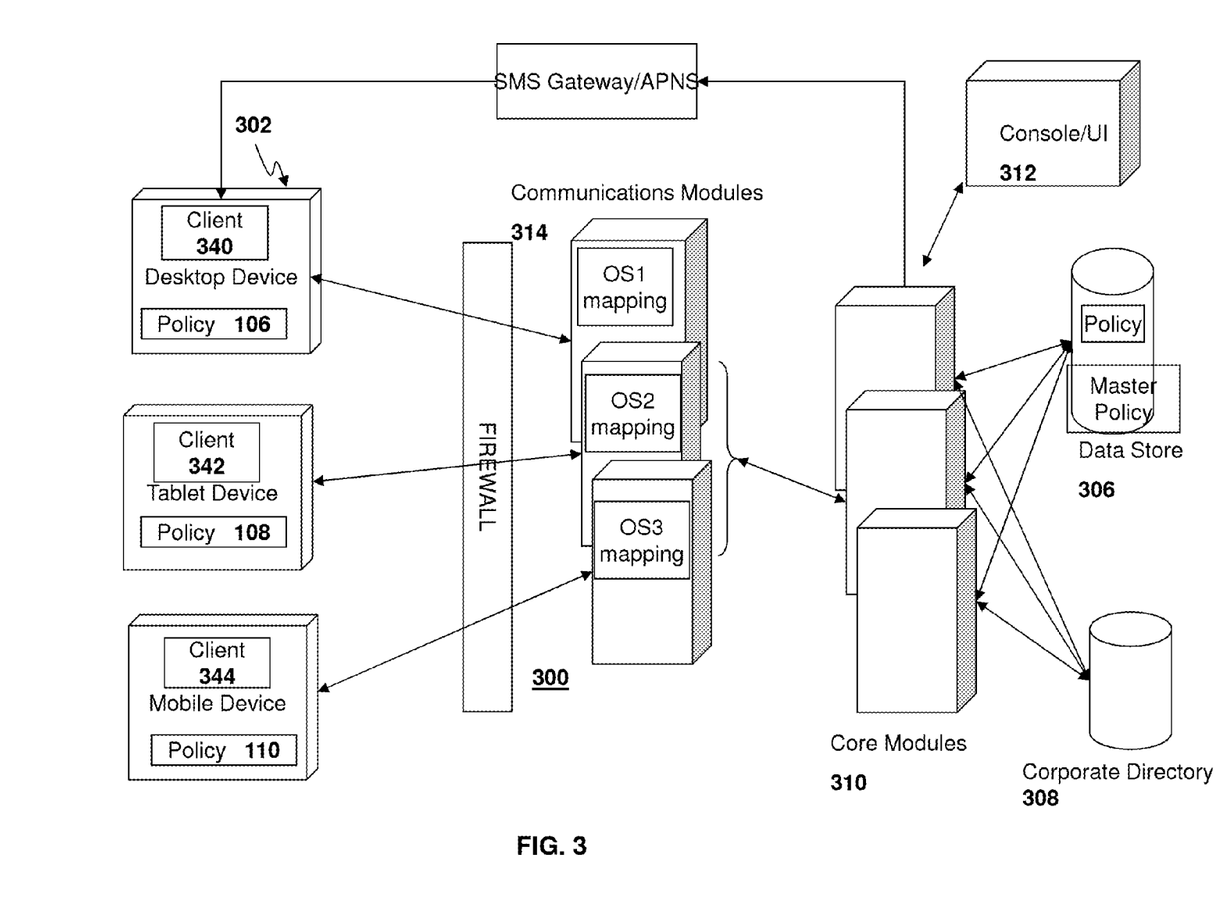
FIG. 3 is a block diagram of a system for policy management according to an embodiment of the present matter.

Referring now to FIG. 3 there is shown a system for managing policies 300 for a group of wireless devices 302 according to an embodiment of the present matter. The system includes a data store 306, corporate directory 308, core modules 310, console module 312, communications module subsystem 314 and client modules on the wireless devices 302. The core module is responsible for controlling access to the data store, communications with enterprise services, and notifications to the devices. The communication modules are responsible for managing communications with the wireless devices 302 and for translating key value pairs into XML, JSON, text, binary or the appropriate distinct protocol of the wireless device. A separate communications module may be implemented for each platform along with the associated mappings between the generic policy definitions (key value pairs) and the supported configurations and settings of the platform. In the illustrated FIG. 3 each platform has its own respective set of mappings OS1, OS2, OS3. As mentioned earlier, for each operating system/device there is a key names-mapping relationship that specifies policy items (keynames) applicable to a platform. This mapping is then used against the global policy to extract the appropriate subset of policies which is then mapped to the requesting device protocol. These functions are performed by the communications module. The console 312 is responsible for presenting the administrative UI and provides a web application that allows administrators to manage mobile devices.

Client applications 340-344 on the wireless device are responsible for communicating from the wireless device to the management system. A scheduler may also be deployed and is responsible for managing scheduled tasks, such as informing the wireless device it should establish a session with the communication module immediately. By default, the wireless device has pre-defined polling intervals to contact the communication server. The system 300 can be deployed in a variety of server configurations to address IT requirements for security, scalability, and availability. Various deployment scenarios fall into three main categories: Single server for simpler small organization deployments; Dual server with DMZ for deployments having the enhanced network security of an extra firewall between the communication subsystem and the core module; and high availability multi-server farm for deployments that require the enhanced scalability and availability of a server farm.

The core module is responsible for all business logic and 'state machine' logic, ensuring that all the appropriate aspects of a particular action are executed properly. For example when a configuration is updated the business logic includes notifying all affected devices to retrieve the updated profile. The Core module is stateless and it is possible to deploy multiple instances of Core modules to provide significant scalability for database access. The Core module is also responsible for communication with enterprise systems such as Active Directory, and notification communications via APNS (Apple Push Notification Service for iOS devices) and C2DM (Cloud to Device Message for Android devices). Other platforms can utilize special SMS (ie: Symbian), email handling techniques for triggering a response from the mobile device. The mobile client can register as a receiver for SMS messages and process special messages accordingly.

Figure 4:
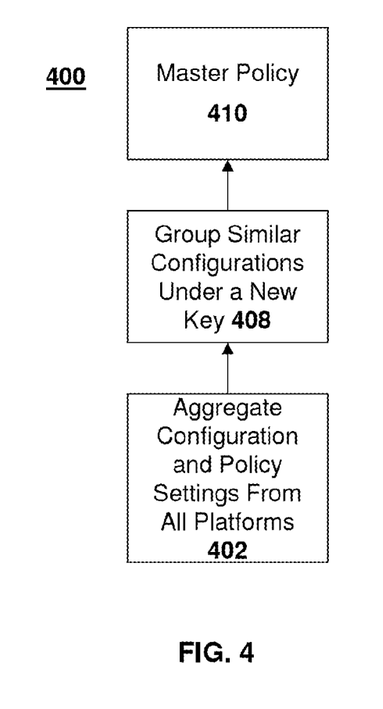
FIG. 4 is a flow chart of a method according to an embodiment of the present matter.

Referring now to FIG. 4 there is shown a flow chart 400 of a method for creating a master set of device agnostic definitions or rules as described earlier with reference to FIG. 2.

In particular, as seen from block 402, the process of FIG. 4 receives aggregate configuration and policy settings from all platforms. The process then proceeds to block 408 in which similar configurations are grouped under a new key. The process then proceeds to block 410 in which a master policy is created.

Figure 5:
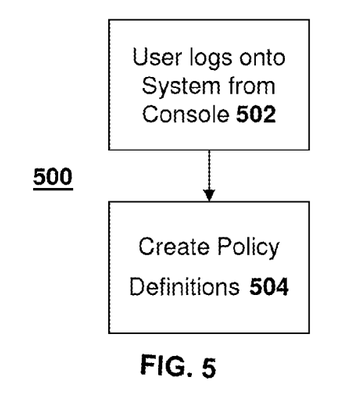
FIG. 5 is a flow chart of a method according to another aspect of an embodiment of the present matter.

Referring to FIG. 5 there is shown a flow chart 500 for creating a global policy for a group of devices according to an embodiment of the present matter.

In particular, at block 502 a user logs onto the system from a console. The process then proceeds to block 504 in which policy definitions are created.

Figure 6:
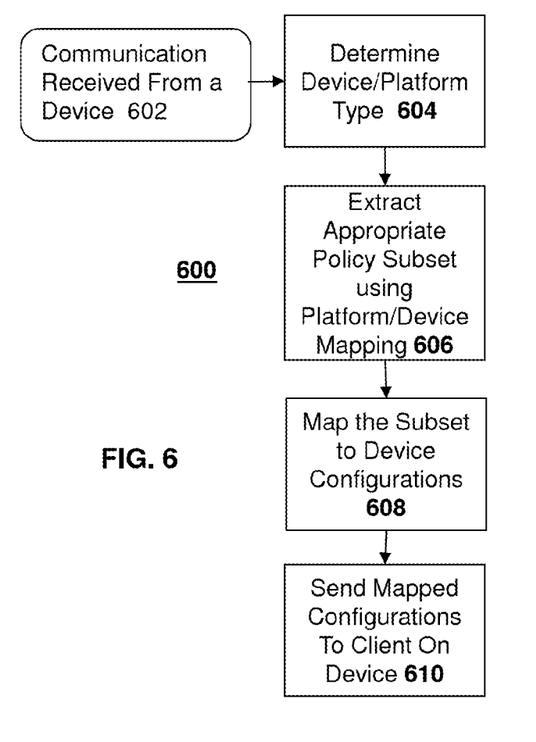
FIG. 6 is a flow chart of a method according to a further aspect of the present matter.

Referring to FIG. 6 there is shown a flow chart for deriving the device configurations from a subset of the created global policy in accordance with an embodiment of the present matter.

In particular, a communication is received from the device at block 602. The process then proceeds to block 604 to determine the device or platform type.

The process then proceeds to block 606 in which an appropriate policy subset is extracted using platform or device mapping.

The process then proceeds to block 608 in which the policy subset is mapped to device configurations. These mapped configurations are then sent to a client on a device, as shown by block 610.

Figure 7:
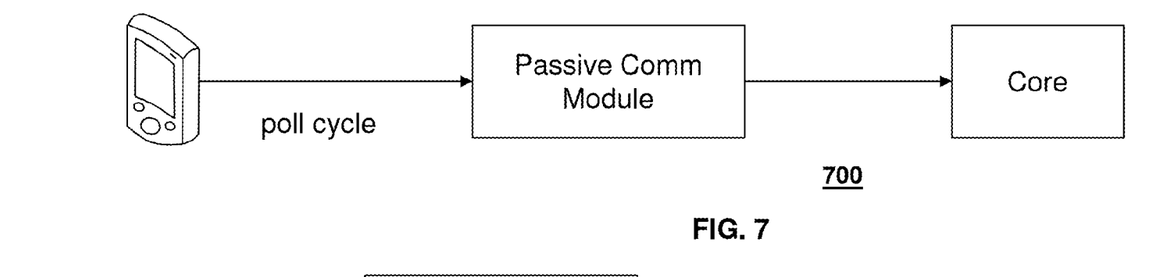
FIG. 7 is a schematic diagram of a system poll cycle according to an embodiment of the present matter.
Figure 8:
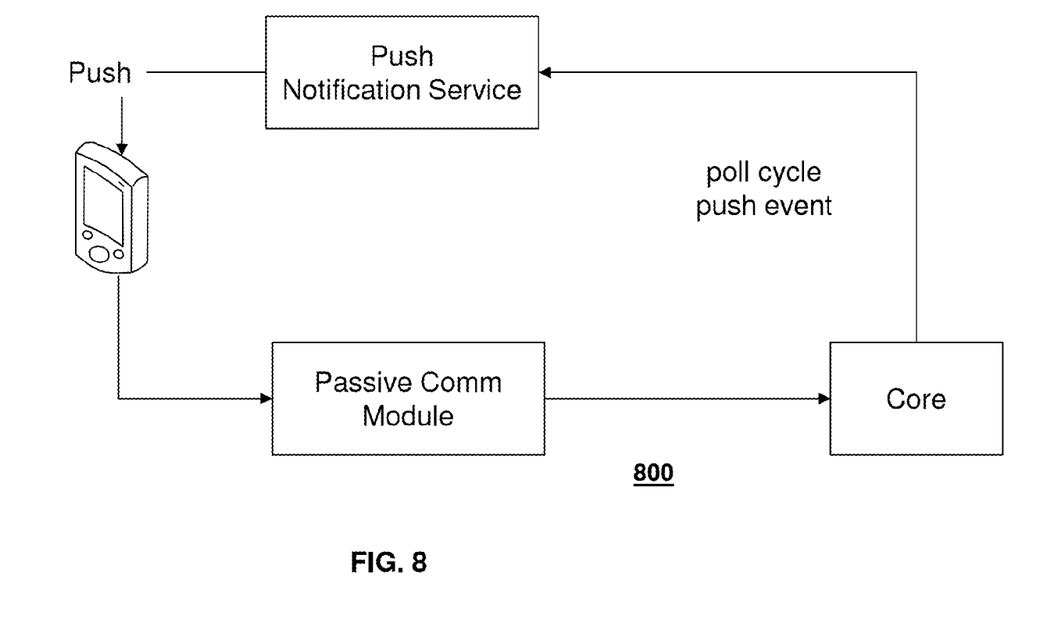
FIG. 8 is a schematic diagram of a system poll cycle according to a further embodiment of the present matter.

Referring to FIG. 7 there is shown a schematic diagram of a process of device enrollment according to an embodiment of the present matter. A device driver installed on the communications module waits for incoming communication. A client installed on the device periodically initiates communication with the communication module. Once the communication module obtains the device id or type the appropriate mappings in the communications module can be determined and the appropriate subset of polices can be extracted, mapped and then applied to the device. FIG. 8 shows an exception to the generic case when the mobile operating system implements a mobile device management daemon where a local client is not necessary and communication is triggered from the device.

In accordance with the present disclosure, any network element, including wireless devices could be used to perform the methods described herein. In general, such network element will include a communications subsystem to communicate with other network elements, a processor and memory which interact and cooperate to perform the functionality of the network element.

Figure 9:
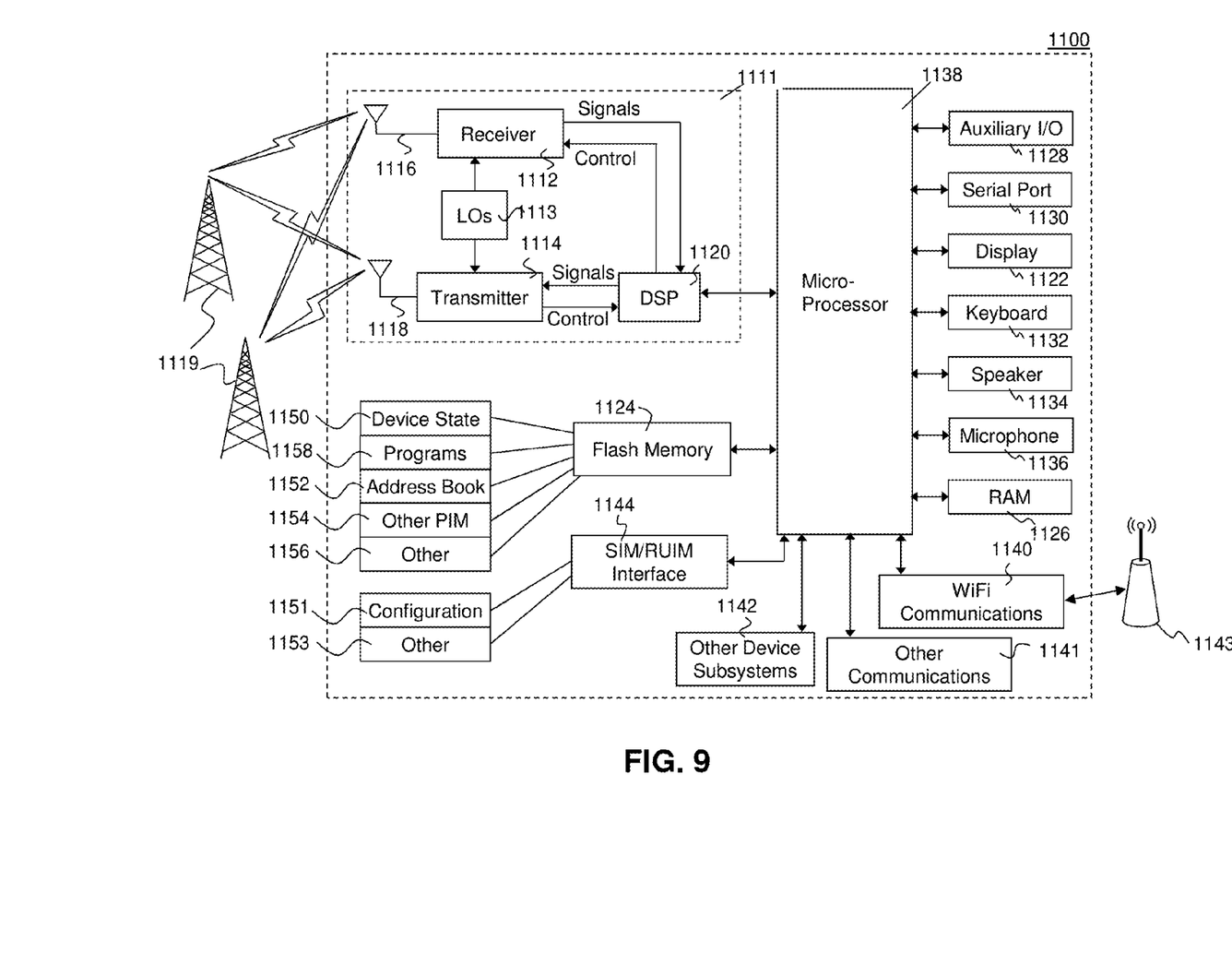
FIG. 9 is a block diagram of an exemplary wireless device.

Further, if the network element is a wireless device, any wireless device may be used. One exemplary wireless device is described below with reference to FIG. 9. The use of the wireless device of FIG. 9 is not meant to be limiting, but is provided for illustrative purposes.

Wireless device 1100 is a two-way wireless communication device. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where wireless device 1100 is enabled for two-way communication, it can incorporate a communication subsystem 1111, including both a receiver 1112 and a transmitter 1114, as well as associated components such as one or more, antenna elements 1116 and 1118, local oscillators (LOs) 1113, and a processing module such as a digital signal processor (DSP) 1120 The particular design of the communication subsystem 1111 depends upon the communication network in which the device is intended to operate.

When required network registration or activation procedures have been completed, wireless device 1100 may send and receive communication signals over the network 1119. As illustrated in FIG. 9, network 1119 can comprise of multiple base stations communicating with the wireless device.

Signals received by antenna 1116 through communication network 1119 are input to receiver 1112, which may perform such common receiver functions as signal amplification, frequency down conversion, filtering, channel selection and the like, and in the example system shown in FIG. 9, analog to digital (A/D) conversion. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

Network access requirements will also vary depending upon the type of network 1119. In some networks network access is associated with a subscriber or user of wireless device 1100. A wireless device may require a removable user identity module (RUIM) or a subscriber identity module (SIM) card in order to operate on a network. The SIM/RUIM interface 1144 is normally similar to a card-slot into which a SIM/RUIM card can be inserted and ejected. The SIM/RUIM card holds many key configurations 1151, and other information 1153 such as identification, and subscriber related information.

Wireless device 1100 includes a processor 1138 which controls the overall operation of the device. Communication functions, including at least data and voice communications, are performed through communication subsystem 1111. Processor 1138 also interacts with further device subsystems such as the display 1122, flash memory 1124, random access memory (RAM) 1126, auxiliary input/output (I/O) subsystems 1128, serial port 1130, one or more keyboards or keypads 1132, speaker 1134, microphone 1136, other communication subsystem 1140 such as a short-range communications subsystem and any other device subsystems generally designated as 1142. Serial port 1130 could include a USB port or other port known to those in the art.

Some of the subsystems shown in FIG. 9 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the processor 1138 can be stored in a persistent store such as flash memory 1124, which may instead be a read-only memory (ROM) or similar storage element (not shown). Specific device applications, or parts thereof, may be temporarily loaded into a volatile memory such as RAM 1126. Received communication signals may also be stored in RAM 1126.

As shown, flash memory 1124 can be segregated into different areas for both computer programs 1158 and program data storage 1150, 1152, 1154 and 1156. These different storage types indicate each program can allocate a portion of flash memory 1124 for their own data storage requirements. Processor 1138, in addition to its operating system functions, can enable execution of software applications on the wireless device. A predetermined set of applications which control basic operations, including at least data and voice communication applications for example, will normally be installed on wireless device 1100 during manufacturing. Other applications could be installed subsequently or dynamically.

A software application may be a personal information manager (PIM) application having the ability to organize and manage data items relating to the user of the wireless device such as, but not limited to, e-mail, calendar events, voice mails, appointments, and task items. Naturally, one or more memory stores would be available on the wireless device to facilitate storage of PIM data items. Such PIM application can have the ability to send and receive data items, via the wireless network 1119. In an embodiment, the PIM data items are seamlessly integrated, synchronized and updated, via the wireless network 1119, with the wireless device user's corresponding data items stored or associated with a host computer system. Further applications may also be loaded onto the wireless device 1100 through the network 1119, an auxiliary I/O subsystem 1128, serial port 1130, short-range communications subsystem 1140 or any other suitable subsystem 1142, and installed by a user in the RAM 1126 or a non-volatile store (not shown) for execution by the microprocessor 1138. Such flexibility in application installation increases the functionality of the device and may provide enhanced on-device functions, communication-related functions, or both.

In a data communication mode, a received signal such as a text message or web page download will be processed by the communication subsystem 1111 and input to the microprocessor 1138, which further processes the received signal for element attributes for output to the display 1122, or alternatively to an auxiliary I/O device 1128.

A user of wireless device 1100 may also compose data items such as email messages for example, using the keyboard 1132, which can be a complete alphanumeric keyboard or telephone-type keypad, in conjunction with the display 1122 and possibly an auxiliary I/O device 1128. Such composed items may then be transmitted over a communication network through the communication subsystem 1111.

For voice communications, overall operation of wireless device 1100 is similar, except that received signals would be output to a speaker 1134 and signals for transmission would be generated by a microphone 1136. Alternative voice or audio I/O subsystems, such as a voice message recording subsystem, may also be implemented on wireless device 1100. Although voice or audio signal output is accomplished primarily through the speaker 1134, display 1122 may also be used to provide an indication of the identity of a calling party, the duration of a voice call, or other voice call related information for example.

Serial port 1130 in FIG. 9 would normally be implemented in a personal digital assistant (PDA)-type wireless device for which synchronization with a user's desktop computer (not shown) may be desirable, but is an optional device component. Such a port 1130 would enable a user to set preferences through an external device or software application and would extend the capabilities of wireless device 1100 by providing for information or software downloads to wireless device 1100 other than through a wireless communication network. The alternate download path may for example be used to load an encryption key onto the device through a direct and thus reliable and trusted connection to thereby enable secure device communication. Serial port 1130 can further be used to connect the wireless device to a computer to act as a modem.

WiFi Communications Subsystem 1140 is used for WiFi Communications and can provide for communication with access point 1140.

Other communications subsystem(s) 1141, such as a short-range communications subsystem, are further components that may provide for communication between wireless device 1100 and different systems or devices, which need not necessarily be similar devices. For example, the subsystem(s) 1141 may include an infrared device and associated circuits and components or a Bluetooth™ communication module to provide for communication with similarly enabled systems and devices.

The embodiments described herein are examples of structures, systems or methods having elements corresponding to elements of the techniques of the present application. The above written description may enable those skilled in the art to make and use embodiments having alternative elements that likewise correspond to the elements of the techniques of the present application. The intended scope of the techniques of the above application thus includes other structures, systems or methods that do not differ from the techniques of the present application as described herein, and further includes other structures, systems or methods with insubstantial differences from the techniques of the present application as described herein.

The invention claimed is:

1. A method for managing policies for groups of wireless devices, associated with a corresponding one of multiple different wireless device platforms comprising:
   receiving at a computing device, for all wireless device platforms, sets of configuration settings and policy elements applicable to wireless devices supported by the platforms; and
   generating by the computing device a master set of device agnostic rule definitions, the generating comprising:
      retrieving the received sets of all configuration settings and policy elements into a union set, the union set being a set of all distinct settings and policy elements in the received sets; and
      processing the union set of all the distinct configuration settings and policy elements to form a plurality of groups each group of the plurality of groups containing one or more configuration settings and policy elements associated to platforms that support the one or more configuration setting and policy elements, each group specifying one of the device agnostic rule definitions;
   displaying the master set of device agnostic rule definitions from the processed union set, the device agnostic rule definitions having rules that are defined without regard to constraints on the configuration settings governed by the multiple different wireless device platforms;
   receiving a global policy composed from a subset of the displayed device agnostic rule definitions;
      determining from each of the rule definitions in the received global policy the associated-to platforms and a corresponding configuration setting and policy elements; and
      transmitting to the determined associated-to platform, the corresponding configuration settings and policy elements.

2. The method of claim 1, further including creating mappings of rules in the master set to the configuration settings of ones of said multiple different wireless device platforms, the mappings allowing for selection of appropriate platform subsets from the master set.

3. The method of claim 2, wherein the mappings associate device hardware with rule definitions.

4. The method of claim 2, wherein the mappings associate wireless operating system type with rule definitions.

5. The method of claim 2, wherein the mappings associate device vendor with rule definitions.

6. The method of claim 2, wherein the mappings associate operating system family with rule definitions.

7. A method for managing policies for a group of wireless devices, members of the group having configurable options that are set by configuration settings governed by a Corresponding one of multiple different wireless device platforms associated with respective ones of the group of wireless devices, the method comprising:
generating, by a computing device, from a master set of device agnostic rule definitions a global policy for the group of wireless devices, the global policy having at least one policy item that defines rules for limiting certain functionality of the group, the master set being generated by:
retrieving received sets of all configuration settings and policy elements into a union set, the union set being a set of all distinct settings and policy elements in the received sets; and;
processing the union set of all the distinct configuration settings and policy elements to form a plurality or groups containing one or more configuration setting and policy elements associated to platforms that support the one or more configuration setting and policy elements, each group specifying one of the device agnostic rule definitions;
displaying the master set of the device agnostic rule definitions from the processed union set, the device agnostic rule definitions having rules defined without regard to constraints on the configuration settings governed by the multiple different wireless device platforms;
receiving the global policy composed from a subset of the displayed device agnostic rule definitions;
determining from each of the rule definitions in the received global policy the associated-to platforms and a corresponding configuration setting and policy elements; and
providing to the determined associated-to platform, the corresponding configuration settings and policy elements;
applying the provided configuration settings and policy elements to the associated wireless devices.

8. A system for managing policies for groups of wireless devices, each member of the group having configurable options that are set by configuration settings defined in a platform policy, the configuration settings in the platform policy are determined by a corresponding one of multiple different wireless device platforms associated with respective ones of the group of wireless devices, the system comprising:
a computing device having a processor configured to:
generate a global policy for the group, the policy having at least one policy item;
defining rules for limiting certain functionality of the group, the global policy being generated from a master set of device agnostic rule definitions by:
retrieving received sets of all configuration settings and policy elements into a union , set the union set being a set of all distinct settings and policy elrements in the received sets; and;
processing the union set of all the distinct configuration settings and policy elements to form a plurality of groups containing one or more configuration settings and policy elements associated to platforms that support the one or more configuration setting and policy elements, each group specifying one of the device agnostic rule definitions;
displaying the master set of the device agnostic rule definitions from the processed union set, the device agnostic rule definitions having rules defined without regard to constraints on the configuration settings governed by the multiple different wireless device platforms;
receiving the global policy composed from a subset of the displayed device agnostic rule definitions;
determining from each of the rule definitions in the received global policy the associated-to platforms and a corresponding configuration setting and policy elements; and
a communication subsystem providing to the determined associated-to platform, the corresponding configuration settings and policy elements; and.

9. The system of claim 8, further comprising:
an administrative console communicatively coupled to the processor that allows administrators to manage the groups of wireless devices.

10. The system of claim 8, further comprising:
a data store accessible to the processor, wherein the processor is further configured to access the data store.

11. The system of claim 8, further comprising:
a directory accessible to the processor, wherein the processor is further configured to access the directory.

12. The system of claim 8, wherein the communications subsystem is configured to manage communications with the groups of wireless devices.

13. The system of claim 8, further comprising:
a client application installed on each member of the group of wireless devices, each client application for:
enforcing policy compliance by initiating communication with the communications subsystem; and
applying the configuration settings received from the communications subsystem.

14. The system of claim 13, wherein each client application contacts the respective communications subsystem at a polling interval.

15. The system of claim 8, wherein a separate communications subsystem is implemented for each of said wireless device platforms.

16. The system of claim 8, wherein each of said wireless device platforms has its own respective set of mappings.

17. The system of claim 13, wherein a device driver is installed on the communications subsystem and waits for incoming communication from the client application.

18. The system of claim 8, wherein the communications subsystem is further configured to:
receive a communication from a client application installed on the member of the group of wireless devices, wherein the communication includes a device ID;
determine a mapping based on the device ID; and
using the determined mapping to extract and transmit a subset of policy items to the group of wireless devices for applying by respective wireless devices in the group.

* * * * *

UNITED STATES PATENT AND TRADEMARK OFFICE
CERTIFICATE OF CORRECTION

PATENT NO. : 9,756,501 B2
APPLICATION NO. : 13/331851
DATED : September 5, 2017
INVENTOR(S) : Aaron Ardiri and Stephan Hellerbrand It is certified that error appears in the above-identified patent and that said Letters Patent is hereby corrected as shown below:

In the Claims

• In Claim 1, Column 12, Line 42, a "," is missing between the words "groups" and "each";

• In Claim 7, Column 13, Line 11, the word "Corresponding" should be "corresponding";

• In Claim 8, Column 13, Line 64, the "," between the words "union" and "set" should be removed and placed between the words "set" and "the union";

• In Claim 8, Column 14, Line 23, "and." should be removed.

Signed and Sealed this
Sixth Day of November, 2018

Andrei Iancu
*Director of the United States Patent and Trademark Office*